(12) United States Patent
Choi et al.

(10) Patent No.: US 7,903,595 B2
(45) Date of Patent: Mar. 8, 2011

(54) APPARATUS AND METHOD FOR TRANSMITTING AND RECEIVING A REVERSE CHANNEL IN A MOBILE COMMUNICATION SYSTEM FOR PACKET DATA

(75) Inventors: Ji-Hoon Choi, Suwon-si (KR); Youn-Sun Kim, Seongnam-si (KR); Sung-Kwon Jo, Suwon-si (KR); Ji-Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 11/487,967

(22) Filed: Jul. 18, 2006

(65) Prior Publication Data

US 2007/0015529 A1    Jan. 18, 2007

(30) Foreign Application Priority Data

Jul. 18, 2005  (KR) ................ 10-2005-0065057
Jul. 19, 2005  (KR) ................ 10-2005-0065527

(51) Int. Cl.
*G08C 17/00* (2006.01)
*G01R 31/08* (2006.01)
*H04W 24/00* (2009.01)
*H04B 1/38* (2006.01)
*H04J 3/00* (2006.01)

(52) U.S. Cl. ......... 370/311; 370/236; 370/336; 370/337; 455/456.4; 455/574

(58) Field of Classification Search .......... 370/311, 370/318, 331, 322, 236, 336, 337; 455/574, 455/456.4

See application file for complete search history.

(56) References Cited

U.S. PATENT DOCUMENTS

| | | | |
|---|---|---|---|
| 6,347,081 B1 | 2/2002 | Bruhn | |
| 2003/0040315 A1* | 2/2003 | Khaleghi et al. | 455/435 |
| 2003/0128683 A1 | 7/2003 | Duncan Ho et al. | |
| 2004/0029622 A1* | 2/2004 | Laroia et al. | 455/574 |
| 2004/0157651 A1* | 8/2004 | Duncan Ho et al. | 455/574 |

(Continued)

FOREIGN PATENT DOCUMENTS

CN    1534900 A    10/2004

(Continued)

OTHER PUBLICATIONS

Rashid A. Attar and Eduardo Esteves, A Reverse Link Outer-Loop Power Control Algorithm for cdma2000 1xEV Systems; Qualcomm Incorporated, 5775 Morehouse Drive, San Diego, CA 92121.

(Continued)

*Primary Examiner* — Kamran Afshar
*Assistant Examiner* — Kathy Wang-Hurst
(74) *Attorney, Agent, or Firm* — Roylance, Abrams, Berdo & Goodman, L.L.P.

(57) ABSTRACT

An apparatus and method for transmitting and receiving a symbol through a reverse control channel in a mobile communication system for providing packet data are provided. When reverse traffic is present, the apparatus and method can effectively demodulate and decode the reverse traffic. In a method for transmitting a reverse channel in the mobile communication system capable of discontinuously transmitting packet data, a transmission is performed by setting power of a Data Rate Indicator (DRI) channel to a predefined power when packet data is transmitted. When no packet data is transmitted, a transmission is performed by decreasing the power of the DRI channel.

28 Claims, 13 Drawing Sheets

U.S. PATENT DOCUMENTS

| | | |
|---|---|---|
| 2004/0218559 A1 | 11/2004 | Kim et al. |
| 2004/0233867 A1 | 11/2004 | Wheatley et al. |
| 2005/0201296 A1* | 9/2005 | Vannithamby et al. ....... 370/241 |
| 2006/0252429 A1* | 11/2006 | Chen et al. .................... 455/450 |

FOREIGN PATENT DOCUMENTS

| | | |
|---|---|---|
| JP | 10-70772 A | 3/1998 |
| JP | 2002-542649 A | 12/2002 |
| JP | 2003-536348 A | 12/2003 |
| JP | 2004-514371 A | 5/2004 |
| KR | 1020010007230 | 1/2001 |
| KR | 1020020061857 | 7/2002 |
| KR | 1020030041766 | 5/2003 |
| KR | 1020030077908 | 10/2003 |
| RU | 2004100940 A | 11/2004 |
| TW | 392395 | 6/2000 |
| TW | 525354 | 3/2003 |
| TW | 525357 | 3/2003 |
| TW | 200400735 A | 1/2004 |
| WO | WO-0201761 A1 | 1/2002 |
| WO | WO-0207372 A2 | 1/2002 |
| WO | WO-02/78212 A1 | 10/2002 |
| WO | WO-2004/025869 A2 | 3/2004 |
| WO | WO 2004/075496 A2 | 9/2004 |

OTHER PUBLICATIONS

Sumantra Chakravarty, Rajesh Pankaj and Eduardo Esteves; An Algorithm for Reverse Traffic Channel Rate Control for cdma2000 High Rate Packet Data Systems; Qualcomm Incorporated; 5775 Morehouse Drive, San Diego, CA 92121-1714.

* cited by examiner

APPARATUS AND METHOD FOR TRANSMITTING AND RECEIVING A REVERSE CHANNEL IN A MOBILE COMMUNICATION SYSTEM FOR PACKET DATA

PRIORITY

This application claims the benefit under 35 U.S.C. §11(a) of Korean Patent Applications filed in the Korean Intellectual Property Office on Jul. 18, 2005 and assigned Serial No. 2005-65057 and filed on Jul. 19, 2006 and assigned Serial No. 2005-65527, the contents of both of which are hereby incorporated by reference.

BACKGROUND OF THE INVENTION

1. Field of the Invention

The present invention generally relates to an apparatus and method for transmitting and receiving information in a mobile communication system. More particularly, the present invention relates to an apparatus and method for transmitting and receiving information through a reverse control channel in a mobile communication system for providing packet data.

2. Description of the Related Art

Conventionally, mobile communication systems have been divided into systems for supporting only a voice service, only a data service and both the voice service and the data service. In these systems, the most widely used communication scheme is Code Division Multiple Access (CDMA). The systems using the CDMA are referred to as the CDMA mobile communication systems. Among the CDMA mobile communication systems, the system for supporting only the voice service is a system of the Interim Standard (IS-95). The CDMA system for supporting both the voice service and the data service is a CDMA 2000 system. For example, a mobile communication system for providing only high-rate packet data is a High Rate Packet Data (HRPD) mobile communication system based on the CDMA. In the mobile communication systems, both forward and reverse link transmissions are present. Herein, a forward link is a link from a base station to a mobile station and a reverse link is a link from a mobile station to a base station.

The forward and reverse link transmissions in the HRPD mobile communication system will be described. The HRPD mobile communication system exploits Time Division Multiple Access (TDMA) as a multiple access scheme and exploits Time Division Multiplexing/Code Division Multiplexing (TDM/CDM) as a multiplexing scheme. The forward link transmission is performed after data to be transmitted in the forward link is set in the HRPD system. Alternatively, when data is transmitted in the reverse link in the HRPD system, multiple mobile stations simultaneously transmit data in the reverse link.

To support high-speed data communication in the forward and reverse directions in the CDMA mobile communication system such as the CDMA 2000 or HRPD system, the mobile station transmits a Data Rate Control (DRC) channel carrying information regarding a transmission rate of data to be received in the forward direction and transmits a Reverse Rate Indicator (RRI) channel carrying information about a traffic channel to be transmitted in the reverse direction. The base station and the mobile station exchange the control information, thereby smoothly performing data communication.

On the other hand, the mobile communication system divides one encoded transmission packet into multiple subpackets to transmit the subpackets in a subpacket unit using a Hybrid Automatic Request (HARQ) transmission scheme. Thus, a receiving side decodes received subpackets, thereby increasing data transmission efficiency. However, subpacket index information indicating a position of an associated subpacket of the entire packet is required to decode the received subpackets. That is, when the HARQ transmission scheme is exploited, data rate information should be transmitted in every subpacket. Consequently, the subpacket index and the data rate information of a data rate indicator channel should be simultaneously transmitted.

In an example of a system using the data rate indicator channel, the RRI channel is used for the reverse link of CDMA 1x Evolution Data Only (1xEV-DO) Revision A (hereinafter, referred to as "1xEV-DO"). In 1xEV-DO, a pilot channel, a control channel including an RRI, and a data channel are transmitted in parallel. The channels are spread by different Walsh codes, and are transmitted after time division. Transmit power of a signal to be transmitted on each channel is adjusted by a gain of each channel defined as a relative value to a pilot channel. In the reverse link of 1xEV-DO, a value between 0 and 15 is transmitted on the RRI channel according to payload size, so that a receiver is notified of a data rate. Furthermore, a Walsh code used to spread an RRI symbol is changed according to a subchannel index so that the subchannel index for the HARQ is transmitted together with the RRI symbol.

The mobile communication system transmits/receives an Acknowledgement/Negative Acknowledgement (ACK/NACK) signal for notification of a reception state for a traffic channel, and transmits a Data Source Control (DSC) channel and so on for supporting a handoff between base stations.

When the information is constantly transmitted, interference may occur due to the signals. As the interference increases, the total capacity decreases. This problem becomes severe as the number of mobile stations for receiving service from one base station increases. In this case, the reverse capacity significantly decreases. Consequently, a reverse transmission rate is limited.

To remove the reverse interference of the mobile station, a method using Discontinuous Transmission (DTX) mode for control channels has been proposed. This method will be described with reference to FIG. 1.

FIG. 1 is a timing diagram illustrating the DTX mode for reverse control channels in the 1xEV-DO mobile communication system in which the DTX is performed.

FIG. 1 illustrates an example in which the DTX of reverse traffic is performed in a 4-slot unit. A reverse traffic channel 141 transmits data at a predetermined transmission rate when the data to be transmitted in the reverse link is present in the mobile station. The mobile station transmits RRI information on an RRI channel to give notification of the transmission rate of the reverse traffic. At this time, the DTX is performed in a 2-slot unit in the 1xEV-DO system. As illustrated in the lower section of FIG. 1, a control channel is generated in which a transmission interval and a non-transmission interval are repeated in the 2-slot unit. The mobile station transmits the RRI information on the RRI channel in the transmission interval and does not transmit the RRI information in the non-transmission interval. That is, the RRI channel transmits the RRI information to give notification that a reverse transmission rate is 0 in intervals 131 and 135 in which no reverse traffic is transmitted. The RRI channel indicates a transmission rate of data to be transmitted in the reverse link in intervals 132 and 134 in which the reverse traffic is transmitted.

The reason why the notification that the reverse transmission rate is 0 is given is as follows.

In the communication system that uses a packet transmission scheme, a transmission data rate is adjusted according to presence of data or traffic data that can be discontinuously transmitted. If a transmitter does not report the presence of data transmission to a receiver, the receiver should verify the presence of data in every time interval in which the packet transmission is possible. When data is not transmitted to reduce an unnecessary load of the receiver, a data indicator channel is transmitted at a null rate to notify that a packet to be transmitted on a data channel is absent. This occurs where an RRI symbol transmits 0.

Referring to FIG. 1, no RRI information is transmitted in the non-transmission interval since an interval 133 in which traffic is transmitted in the reverse link is mapped to the DTX mode. In the 1xEV-DO system, the mobile station transmits DRC information for indicating a transmission rate for forward reception to the base station through the DRC channel. The system of FIG. 1 supports the DTX mode. The DRC channel transmits the DRC information in intervals 121 and 122, but does not transmit it in the non-transmission interval.

The DSC channel for the handoff is transmitted together with an ACK channel (ACKCH) within one slot through time division. That is, DSC information is transmitted in a half slot of one slot and an ACK signal is transmitted in the remaining half slot. The ACK signal and the DSC information are transmitted according to the transmission interval and the non-transmission interval. Also, an interval of the reverse pilot channel is divided into the transmission interval and the non-transmission interval. That is, an interval 103 is the transmission interval in which a reverse pilot is transmitted and an interval 104 is the non-transmission interval in which no reverse pilot is transmitted. The reverse pilot may also be transmitted in the non-transmission interval only when reverse data is transmitted, such as, the reverse data is present as in the interval 141.

As described above, the RRI information indicates a transmission rate of traffic to be transmitted in the reverse direction. Thus, the RRI information is used to demodulate and decode data. However, when the RRI is partially transmitted also in the interval when the reverse traffic channel is transmitted in the DTX mode, the following problems occur.

First, when the RRI information is discontinuously transmitted even in the interval when traffic is transmitted on the reverse traffic channel, it is difficult for necessary control information to be extracted without error when a traffic channel of an associated interval is received, demodulated, and decoded using the discontinuously transmitted RRI information. That is, traffic demodulation and decoding performances may be degraded due to RRI error.

Second, when an error occurs in the RRI information, a retransmission ratio of reverse traffic increases. Consequently, loss due to the retransmission of reverse traffic is greater than the gain obtained by discontinuously transmitting a reverse control channel. When reverse traffic is absent as in the intervals 103 and 104 in which the pilot is discontinuously transmitted, the discontinuous transmission of the RRI does not become a large problem. Because the RRI information is not used to recover a reverse traffic channel when the reverse traffic channel is not transmitted, a method for transmitting a reverse control channel to effectively demodulate and decode reverse traffic is required.

Third, because the RRI channel transmits only information for packet recovery in the receiver, power used for the RRI channel and interference serve as overhead in the overall system and therefore system capacity decreases. Because an amount of data to be transmitted on the RRI channel is constant regardless of a packet data rate, overhead due to the RRI channel relatively increases when an amount of traffic to be transmitted in the reverse direction is small, such as, a data rate is low.

Fourth, the battery use time is reduced as transmit power due to the RRI channel increases in the case of the reverse link of the 1xEV-DO system. For example, the RRI channel is continuously transmitted, despite a low transmission data rate and a low ratio of an actual packet transmission time to a total communication time when Voice over Internet Protocol (VoIP) is used. Thus, power consumption due to the RRI channel relatively increases. This causes the effective use time of the mobile station to be reduced.

Accordingly, there is a need for an improved system and method for transmitting a reverse control channel that can effectively demodulate and decode reverse traffic when the reverse traffic is present in a mobile communication system for supporting a discontinuous transmission.

SUMMARY OF THE INVENTION

It is, therefore, an object of an exemplary embodiment of the present invention to provide an apparatus and method for transmitting a reverse control channel that can effectively demodulate and decode reverse traffic when the reverse traffic is present in a mobile communication system for supporting a discontinuous transmission.

It is another object of an exemplary embodiment of the present invention to provide an apparatus and method for transmitting a control channel that can improve demodulation and decoding performances for traffic to be transmitted in a reverse direction in a mobile communication system for supporting a discontinuous transmission.

It is yet another object of an exemplary embodiment of the present invention to provide an apparatus and method for transmitting a reverse control channel that can increase reverse capacity in a mobile communication system for supporting a discontinuous transmission.

According to another object of an exemplary embodiment of the present invention to provide an apparatus and method for transmitting a reverse control channel that can reduce retransmission due to error in control information in a mobile communication system for supporting a discontinuous transmission.

Another object of an exemplary embodiment of the present invention provides an apparatus and method that can increase a use time of a mobile station in a mobile communication system for supporting a discontinuous transmission.

It is yet another object of an exemplary embodiment of the present invention to provide an apparatus and method that can reduce power consumption of a mobile station in a mobile communication system for supporting a discontinuous transmission.

In accordance with another aspect of an exemplary embodiment of the present invention, a method for transmitting a reverse channel in a mobile communication system capable of discontinuously transmitting packet data is provided. A transmission is performed by setting power of a Data Rate Indicator (DRI) channel to a predefined power when packet data is transmitted; and performing a transmission by decreasing the power of the DRI channel when no packet data is transmitted.

In accordance with another aspect of an exemplary embodiment of the present invention, a method for receiving a reverse channel in a mobile communication system capable of discontinuously transmitting packet data is provided. A Data Rate Indicator (DRI) value is extracted from received signals and a reliability metric of the DRI value is computed.

The DRI value is erased or set to a detection signal on a basis of a comparison between the computed metric value and a predefined threshold value when a data channel is present in the received signals. The DRI value is set to 0 when the data channel is absent in the received signals.

In accordance with another aspect of an exemplary embodiment of the present invention, an apparatus for transmitting a reverse channel in a mobile communication system capable of discontinuously transmitting packet data is provided. The apparatus comprises a gain controller, a discontinuity controller and a DRI transmitter. The gain controller sets power of a Data Rate Indicator (DRI) channel to predefined power when packet data is transmitted and controls an operation for decreasing the power of the DRI channel by a predefined value when no packet data is transmitted. The discontinuity controller controls a discontinuous transmission of DRI information according to a transmission of the packet data. The DRI transmitter generates the DRI information, sets a gain under control of the gain controller and sets a transmission under control of the discontinuity controller.

In accordance with yet another aspect of an exemplary embodiment of the present invention, an apparatus for receiving a reverse channel in a mobile communication system capable of discontinuously transmitting packet data comprises a receiver, a data detector and a Data Rate Indicator (DRI) detector. The receiver performs synchronization acquisition for received signals and despreads the received signals and the data detector detects whether a data channel has been transmitted among signals output from the receiver. The Data Rate Indicator (DRI) detector extracts a DRI value from the received signals, computes a reliability metric of the DRI value, and erases the DRI value or sets the DRI value to a detection signal on a basis of a comparison between the computed metric value and a predefined threshold value when a data channel is present in the received signals, and detects that the DRI value has not been transmitted when the data channel is absent in the received signals.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In an exemplary embodiment of the present invention, a Data Rate Indicator (DRI) symbol and a Reverse Rate Indicator (RRI) symbol are used together. Each symbol is the symbol for indicating a data transmission rate to be transmitted together with traffic according to a particular system.

Figure 2:
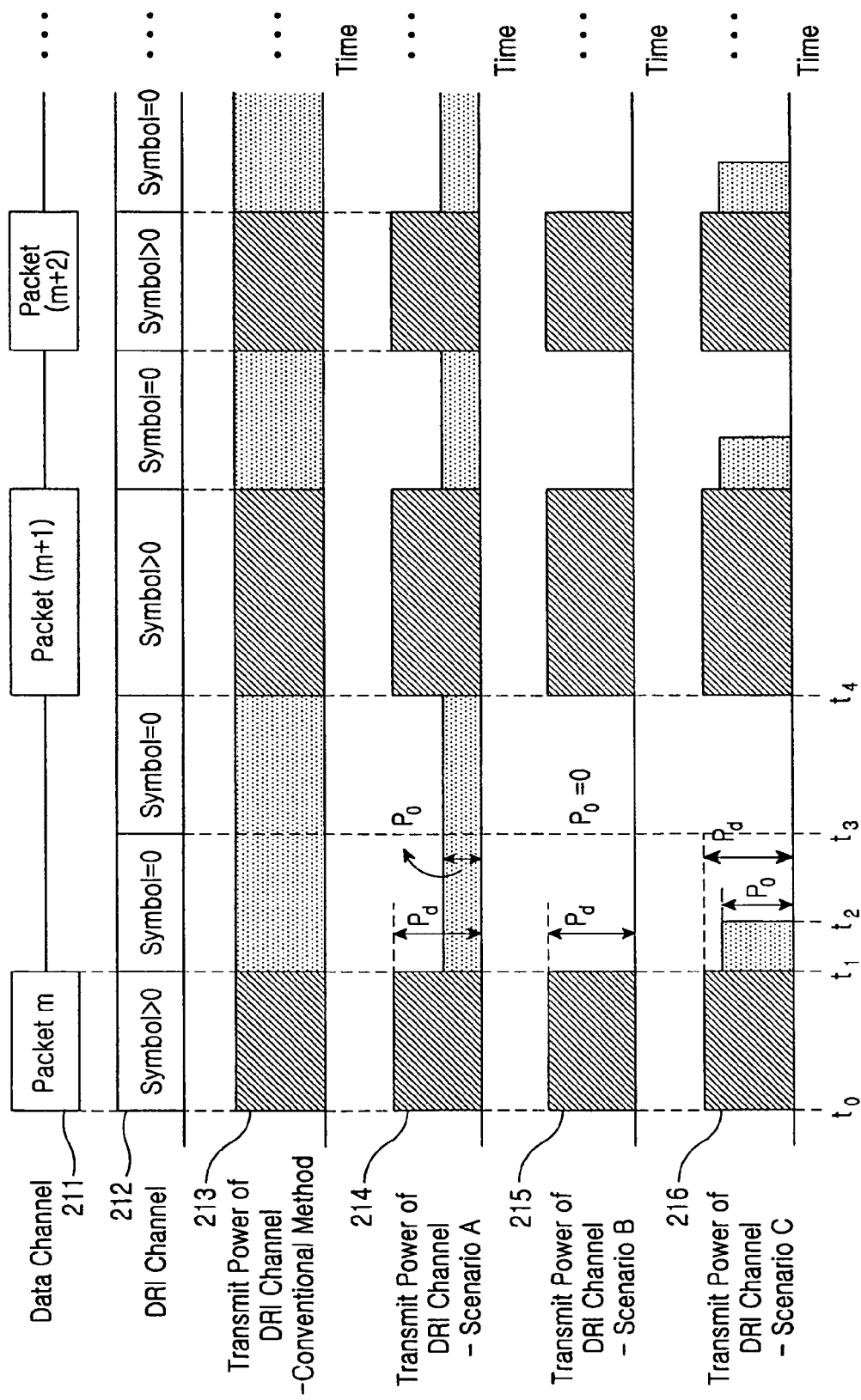
FIG. 2 is a timing diagram illustrating the transmit power of a Data Rate Indicator (DRI) symbol when a data packet and the DRI symbol are transmitted in accordance with a first exemplary embodiment of the present invention.

FIG. 2 is a timing diagram illustrating the transmit power of a Data Rate Indicator (DRI) symbol existing when a data packet and the DRI symbol are transmitted in accordance with a first exemplary embodiment of the present invention. With reference to FIG. 2, the transmit power of a DRI channel is described when a data packet and a DRI symbol are transmitted in parallel in accordance with the first exemplary embodiment of the present invention.

In FIG. 2, reference numeral 211 indicates an example in which a data packet is continuously or discontinuously transmitted according to presence of transmission data in a communication system using a packet transmission. When the data packet is transmitted, the DRI channel is transmitted.

The DRI channel is denoted by reference numeral 212. As illustrated in FIG. 2, the DRI channel 212 transmits a symbol value of more than 0 mapped to a data rate of a transmission packet in an interval in which data is transmitted. The DRI channel 212 transmits a symbol value of 0 mapped to a null rate indicating that data is absent in an interval in which no data is transmitted.

The transmit power of the DRI channel is defined as Pd in the interval in which a data packet is transmitted. The transmit power of the DRI channel is defined as P0 in the interval in which no data is transmitted.

In the first example, the DRI channel can be designed in which Pd=P0 so that a detection error at the null rate is set to be equal to the detection error at the time of data packet transmission as indicated by reference numeral 213, which is different from the RRI channel described with reference to the prior art. In this case, the detection error decreases, but the capacity actually available in a reverse link decreases because the power of the reverse link increases.

Thus, methods for increasing the capacity of the reverse link will be described in the first exemplary embodiment of the present invention. In accordance with the first embodiment, transmission methods denoted by reference numeral 214, 215, or 216 are used.

In an exemplary embodiment of FIG. 2, the first, second, and third methods are denoted by reference numerals 214, 215, and 216, respectively. The present invention proposes these three methods to reduce the transmit power of the DRI channel. The three methods reduce the average transmit power of the DRI channel by commonly setting the transmit power P0 in a full non-transmission interval that is less than the transmit power Pd in the data transmission interval. Even though a symbol detection error occurs in the DRI channel in the full non-transmission interval, it does not affect a data packet reception rate. When an error occurs in the DRI channel in the interval in which a data packet is transmitted, a packet reception rate is degraded. A DRI symbol that is to be transmitted in the full non-transmission interval may have lower importance than the DRI symbol that is to be transmitted in the data transmission interval. In Scenario A, the transmit power of the DRI channel is defined as shown in Equation (1).

$$0 \leq P0 < \min(Pd) \qquad \text{Equation (1)}$$

As shown in Equation (1), a method is used in which the transmit power P0 in the full non-transmission interval is set to be less than the transmit power Pd in the data transmission interval. The P0 value can be set by experimentation and is not defined as a particular value herein. For example, the P0 value can be set to 0.

Scenario B is a method for gating and transmitting the DRI channel in the full non-transmission interval. As illustrated in FIG. 2, a gating period may be set to be equal to a data transmission period, and may be set in a regular slot unit different from the data transmission period. When the DRI channel is not transmitted through gating, the P0 value is set to 0. When the DRI channel is transmitted, the value can be set by experimentation.

Scenario C is a method in which the DRI channel is used for a while only when the full non-transmission interval starts and P0 is set to 0 by gating the DRI channel before a new data packet transmission is started.

These scenarios will be described with reference to the timings. When an interval in which an m-th packet is transmitted is t0~t1 and an interval in which no packet is transmitted is t1~t4, the same DRI symbol is transmitted in the interval t0~t1 in which a packet is transmitted. However, the DRI symbol is conventionally transmitted at the same power also in the interval t1~t4 in which no packet is transmitted. In Scenario A of the present invention, an example in which the DRI channel is transmitted at power mapped to the P0 value is illustrated. In Scenario B, the transmit power of the DRI channel is not allocated in the interval t1~t4, so that interference can be more efficiently reduced. At last, in Scenario C, the transmit power P0 only in the interval t1~t2 of the data non-transmission interval is a predetermined value less than the transmit power Pd in the data transmission interval. At this time, it is preferred that t2 is earlier than t3. Alternatively, t2 may be set to be later than t3.

Assuming that Pd is identical regardless of a type of data packet when the DRI channel is continuously transmitted as in the conventional method as indicated by reference numeral 213, P0=Pd and the average transmit power Pa becomes Pd. At this time, when a ratio between a total transmission time and a data transmission time is defined as Rd, the average transmit power of the DRI channel in the transmission method as indicated by reference numeral 214 is expressed by Equation (2).

$$Pa = RdPd + (1 - Rd)P0 \qquad \text{Equation (2)}$$

Next, the average transmit power of the DRI channel in the transmission method as indicated by reference numeral 215 is defined as shown in Equation (3).

$$Pa = RdPd \qquad \text{Equation (3)}$$

If a ratio at which the DRI channel is discontinuously transmitted in the data non-transmission interval as indicated by reference numeral 216 is defined as Ron, the average transmit power of the DRI channel is defined as shown in Equation (4).

$$Pa = RdPd + (1 - Rd)Ron\,P0 \qquad \text{Equation (4)}$$

In a scheme for transmitting the DRI channel using gating, the average transmit power of the DRI channel can be adjusted by changing Ron and a ratio of P0 and Pd.

Figure 3:
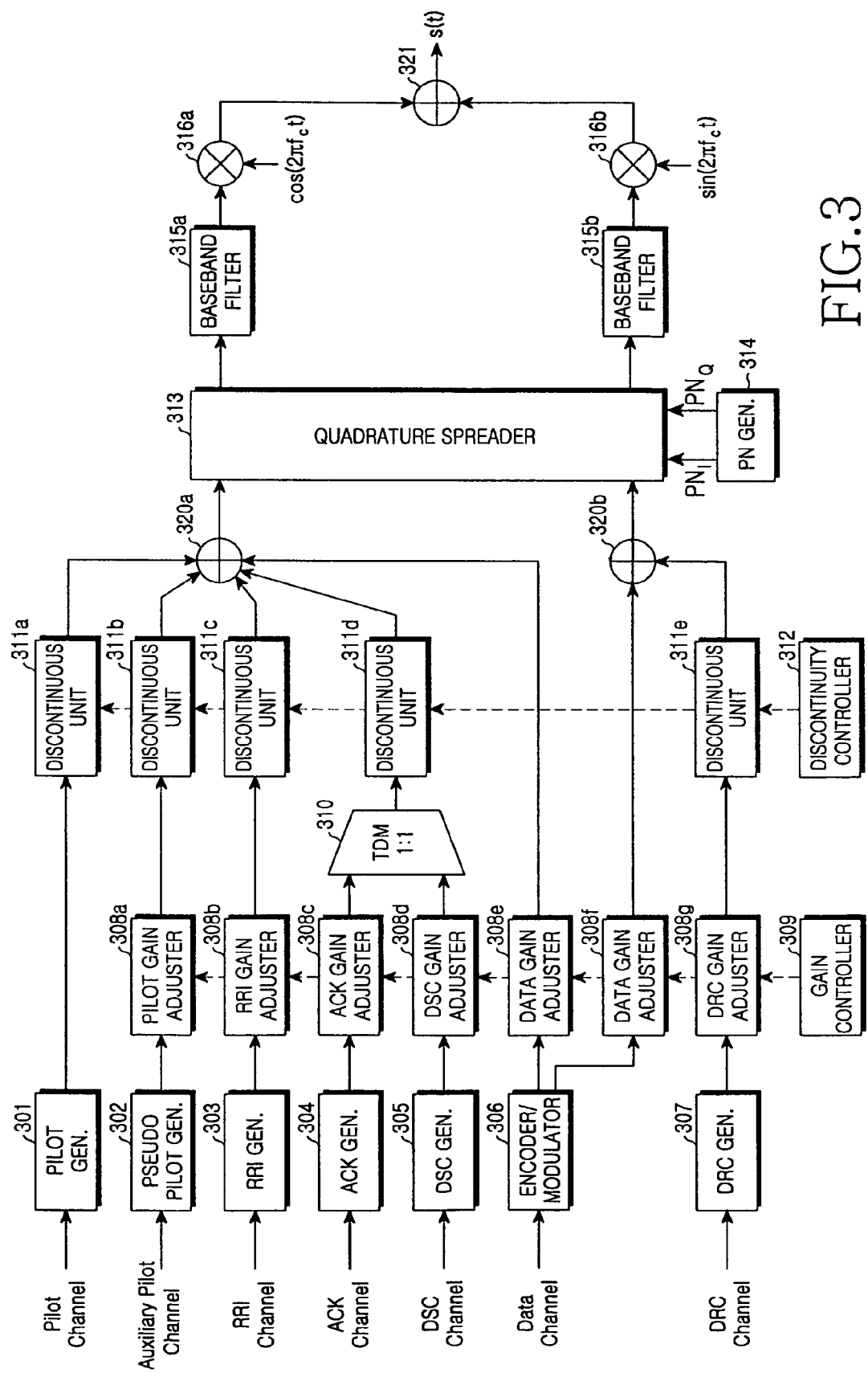
FIG. 3 illustrates a structure of a transmitter when a transmission method proposed in FIG. 2 is applied for a Reverse Rate Indicator (RRI) transmission of 1x Evolution Data Only (1xEV-DO) Revision A (Rev-A)

FIG. 3 illustrates a structure of a transmitter when a transmission method proposed in FIG. 2 is applied for an RRI transmission of 1x Evolution Data Only (1xEV-DO) Revision A (Rev-A). When the method of FIG. 2 is applied to the RRI transmission, the transmitter structure will be described with reference to FIG. 3.

In a 1xEV-DO Rev-A system, the transmitter transmits a pilot channel, auxiliary pilot channel, RRI channel, Data Source Control (DSC) channel, acknowledgement (ACK) channel, Data Rate Control (DRC) channel and data channel in parallel. These channels are classified by different Walsh codes, time division, and I-Q multiplexing. For the channels except, the data channel, signal generators 301, 302, 303, 304, 305, and 307 generate associated channel signals. Only the data channel is encoded and modulated through an encoder/modulator 306 and is branched and input to two data gain adjusters 308e and 308f. The signals generated from the signal generators 302, 303, 304, 305, and 307 for the remaining channels are input to gain adjusters 308a, 308b, 308c, 308d, and 308g, respectively. At this time, transmit power of a signal to be transmitted on each channel is adjusted by changing each channel gain defined as a relative value to the pilot channel. A gain controller 309 changes each channel gain. Because two signals of ACK and DSC signals are transmitted together in one slot as described with reference to the prior art, a time division multiplexer 310 performs a time division multiplexing process for the two signals. A discontinuity controller 312 controls an operation for discontinuously transmitting channel-by-channel signals to be discontinuous.

That is, discontinuous units 311a~311e mapped to channels transmit or interrupt transmission signals under control of the discontinuity controller 312. Among the signals, signals of the pilot channel, pseudo pilot channel, RRI channel, and ACK/DSC channel and an I channel signal of the data channel are input to an adder 320a and are added. The remaining signals are input to an adder 320b and are added.

A quadrature spreader 313 spreads the signals input to the adders 320a and 320b by signals input from a Pseudo Noise (PN) generator 314. The spread signals are divided into I and Q channel signals. The I and Q channel signals are carried on carriers filtered in baseband filters 315a and 315b and are added in an adder 321. The added channel signals are transmitted.

Figure 4:
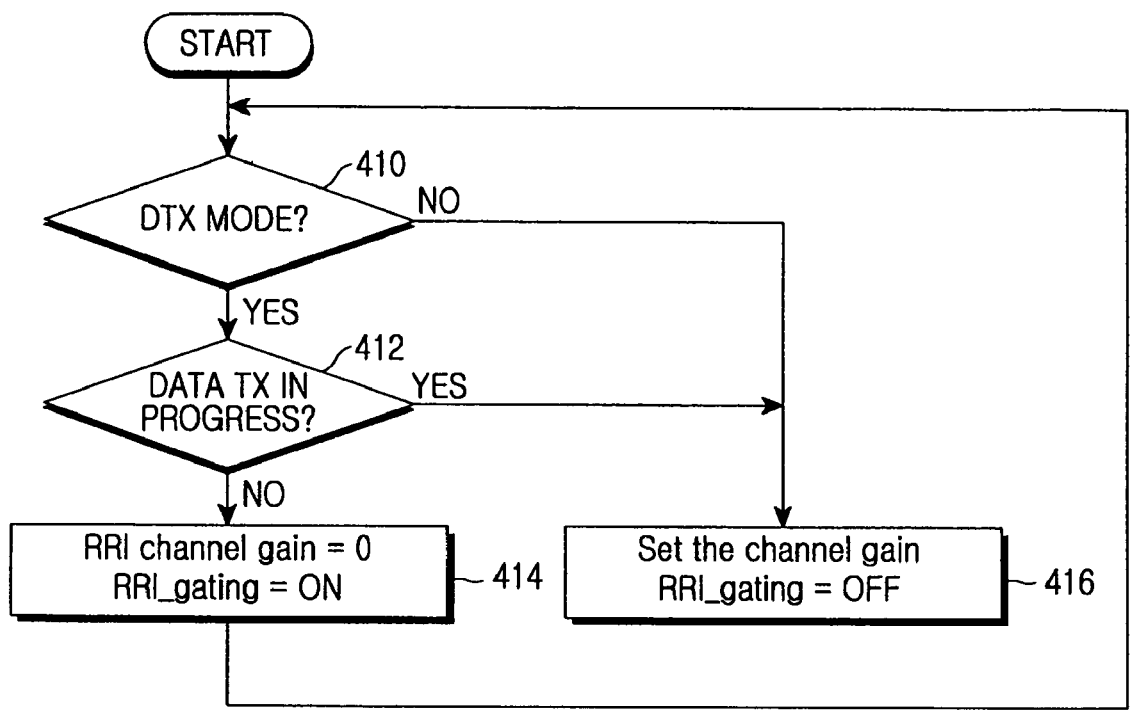
FIG. 4 is a control flow diagram illustrating Scenario B of FIG. 2 when an RRI signal is transmitted in DTX mode of 1xEV-DO Rev-A in accordance with the first exemplary embodiment of the present invention.

FIG. 4 is a control flow diagram illustrating Scenario B of FIG. 2 when an RRI signal is transmitted in DTX mode of 1xEV-DO Rev-A in accordance with the first exemplary embodiment of the present invention. A control process according to Scenario B (denoted by reference numeral 215) will be described in detail with reference to FIG. 4. Because an example of FIG. 4 is related to the 1xEV-DO Rev-A system, an RRI channel will be described in place of a DRI channel.

The transmitter verifies whether the current transmission mode is the DTX mode in step 410. If the current transmission mode is the DTX mode, as a verification result, the transmitter proceeds to step 412. However, if the current transmission mode is not the DTX mode, the transmitter proceeds to step 416. First, if the current transmission mode is not the DTX mode, the transmitter proceeds to step 416 to set an RRI channel gain without applying gating. However, if the current transmission mode is the DTX mode, the transmitter proceeds to step 412 to determine whether the data transmission is in progress. If a transmission of a data channel is in progress, the transmitter proceeds to step 416 to set the channel gain without applying the gating. However, if the data channel is not transmitted, the transmitter proceeds to step 414 to set the RRI channel gating to an ON state and set the RRI channel gain to 0. Because the power P0 is set to 0 at the time of RRI gating in Scenario B, the RRI channel gain is set to 0 in step 414.

Figure 5:
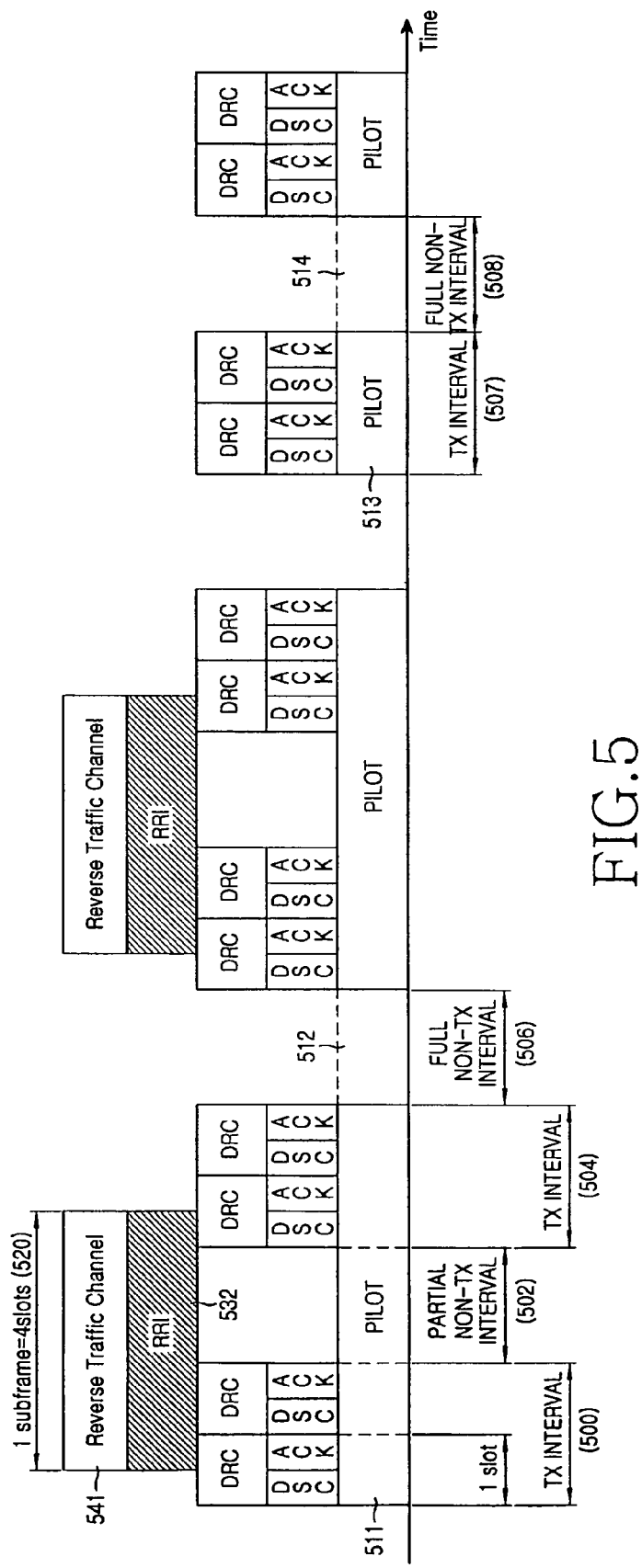
FIG. 5 illustrates transmission states of reverse data and control channels in the DTX mode of 1xEV-DO Rev-A in accordance with the first exemplary embodiment of the present invention.

FIG. 5 illustrates transmission states of reverse data and control channels in the DTX mode of 1xEV-DO Rev-A in accordance with the first exemplary embodiment of the present invention. With reference to FIG. 5, the times at which the reverse data and control channels are transmitted in the DTX mode of 1xEV-DO Rev-A are described in accordance with the exemplary embodiment of the present invention. Because an example of FIG. 5 is related to the 1xEV-DO Rev-A system, an RRI channel will be described in place of a DRI channel.

Scenario B of FIG. 2 (denoted by reference numeral 215) is applied to RRI gating, the RRI channel is transmitted according to the flowchart of FIG. 4, DSC, ACK, and DRC channels are in the ON/OFF state in every 2 slots, and a pilot channel is continuously transmitted in a data transmission interval and is in the ON/OFF state in a data non-transmission interval like other control channels. As illustrated in FIG. 5, the RRI channel and the data channel are simultaneously transmitted at the same time in the data transmission interval and no RRI channel is transmitted in the data non-transmission interval. Thus, the transmit power of the RRI channel can be reduced by a ratio of the data non-transmission interval to the total interval.

It is assumed that a state in FIG. 5 is analogous to that in FIG. 1 as described with reference to the prior art. An example in which reverse traffic is discontinuously transmitted in a 4-slot unit is illustrated in FIG. 5. The reverse traffic channel 541 transmits data at a predetermined data rate when the data to be transmitted from a mobile station is present. As illustrated in the lower section of FIG. 5, a control channel is discontinuously transmitted in a 2-slot unit. That is, a 2-slot transmission interval and a 2-slot non-transmission interval subsequent thereto are repeated. In an exemplary embodiment of the present invention, the non-transmission interval is divided into a partial non-transmission interval and a full non-transmission interval. According to a rule of an exemplary embodiment of the present invention, the intervals are repeated in order of " . . . →Transmission Interval (2 slots)→Partial Non-Transmission Interval (2 slots) or Full Non-Transmission Interval→Transmission Interval (2 £ slots)→Partial Non-Transmission Interval (2 slots) or Full Non-Transmission Interval→ . . . ".

In accordance with an exemplary embodiment of the present invention, transmission intervals 500, 504, and 507 are intervals in which all control information except RRI information is transmitted on reverse control channels. In the transmission intervals 500 and 504, a reverse pilot signal and DSC, ACK and DRC information are transmitted. The DSC, ACK and DRC information is transmitted together in one slot.

Alternatively, full non-transmission intervals 506 and 508 correspond to a state in which no reverse information is transmitted. Thus, reverse traffic should not be transmitted in the full non-transmission intervals 506 and 508, because a reverse pilot is absent only when reverse traffic is absent as described with reference to the prior art.

In the partial non-transmission interval 502, only a reverse pilot channel is transmitted among the reverse control channels except the RRI channel. The reason why the reverse control channels, except the RRI channel, are defined is that the RRI channel is transmitted only when a traffic packet is transmitted, and is not transmitted when no traffic packet is transmitted in Scenario B in accordance with the first exemplary embodiment of the present invention.

As the RRI information is continuously transmitted while the reverse traffic is transmitted, demodulation and decoding performances of the reverse traffic can increase. As no RRI information is transmitted while no traffic is transmitted, a gain in the transmit power can be obtained. Other control information is discontinuously transmitted and the full non-transmission interval is set in an interval in which no reverse traffic is transmitted, so that a gain in the discontinuous transmission can be obtained.

Figure 6:
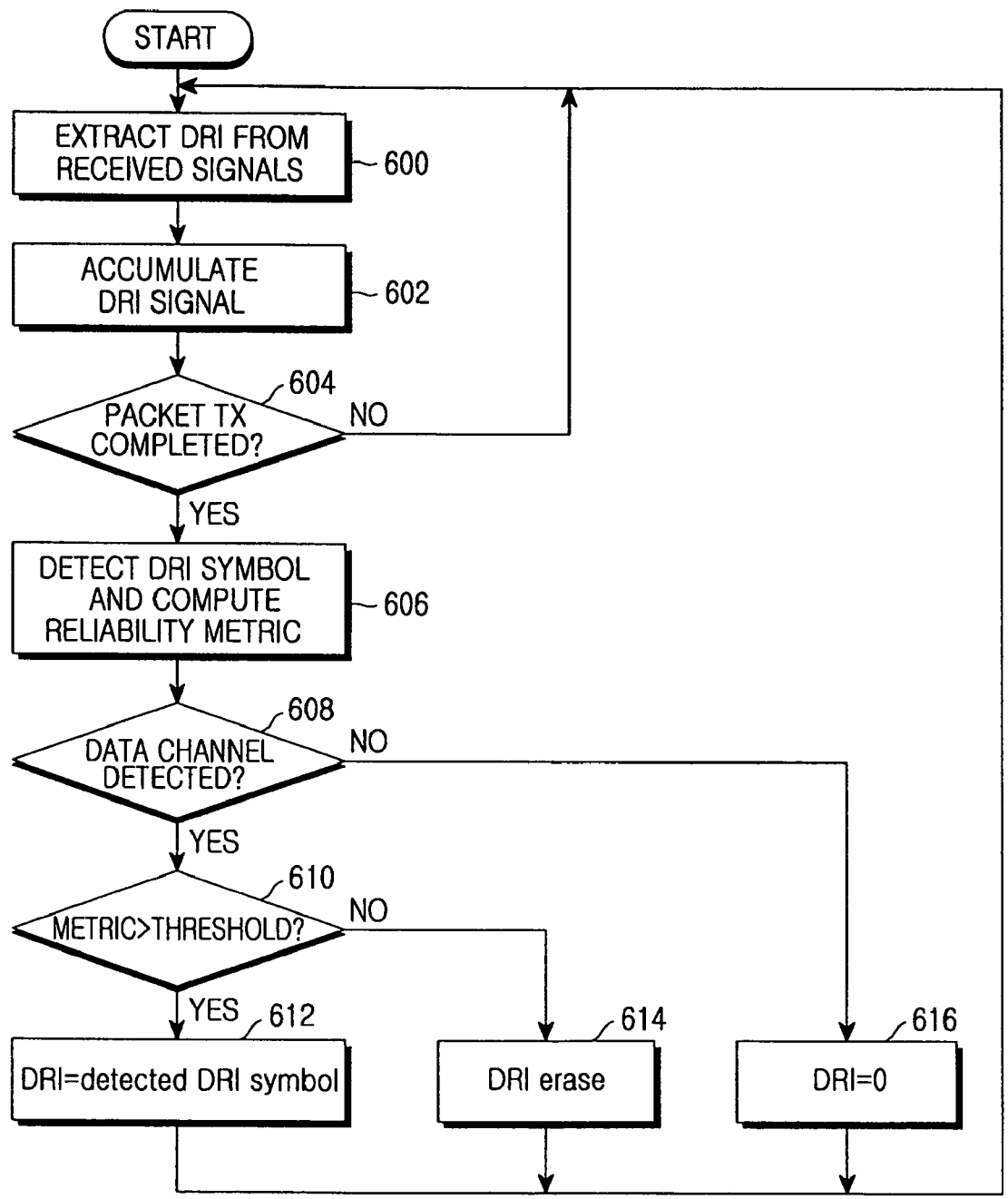
FIG. 6 is a control flow diagram illustrating DRI detection in a receiver when a DRI value is transmitted in one of three methods in accordance with the first exemplary embodiment of the present invention.

FIG. 6 is a control flow diagram illustrating DRI detection in a receiver when a DRI value is transmitted in one of three methods in accordance with the first exemplary embodiment of the present invention. A process for detecting a DRI in the receiver of the present invention will be described in detail with reference to FIG. 6.

When starting to verify a DRI channel, the receiver extracts a signal transmitted on the DRI channel from received signals in step 600. Then, the receiver proceeds to step 602 to accumulate a received signal. After step 602, the receiver proceeds to step 604 to verify whether a packet transmission has been completed. If the packet transmission has been completed, as a verification result, the receiver proceeds to step 606. However, if the packet transmission has not been completed, the receiver proceeds to step 600. The verification as to whether the packet transmission has been completed is performed to repeat steps 600 to 604 until one packet is completely received.

After receiving a DRI symbol for one packet interval through the process, the receiver detects the closest symbol value from the accumulated signal and computes a metric indicating the reliability of the detected symbol value in step 606. The metric indicating the reliability of the detected symbol can use a correlation value between a predefined pattern and a received signal, a Signal to Interference and Noise Ratio (SINR) of a DRI channel, and a noise variance of a DRI channel, among others. Then, the receiver verifies whether a data channel has been detected in step 608. That is, the receiver verifies whether data transmitted on the data channel is present in step 608. The reason the receiver verifies whether the data transmitted on the data channel is present is that the transmit power of the data channel decreases or becomes 0 in the case of the null rate, such as, when no data is transmitted on the data channel. The verification as to whether the data channel has been detected is performed to exactly identify the null rate and the non-null rate.

A data channel detector of the receiver can determine whether a data transmission is present using signal power of the data channel and information about a transmission pattern of a particular control channel when data is transmitted or not transmitted. If the data channel has been detected as a determination result in step 608, the receiver proceeds to step 610. If the data channel has not been detected, the receiver proceeds to step 616 to set a transmission rate to the null rate regardless of the DRI symbol value detected in step 606. When proceeding from step 608 to step 610, the receiver verifies whether the metric computed in step 606 is more than a predefined threshold value. If the computed metric value is more than the predefined threshold value as a verification result, the receiver proceeds to step 612 to set the detected symbol value to a final DRI value. However, if the computed metric is equal to or less than the threshold value as the verification result in step 610, the symbol value detected in step 606 is set to an unreliable value and is erased in step 614. The method of FIG. 6 can increase null-rate detection accuracy using the data channel detector to be described below with reference to FIG. 7 as well as the DRI channel detector.

Figure 7:
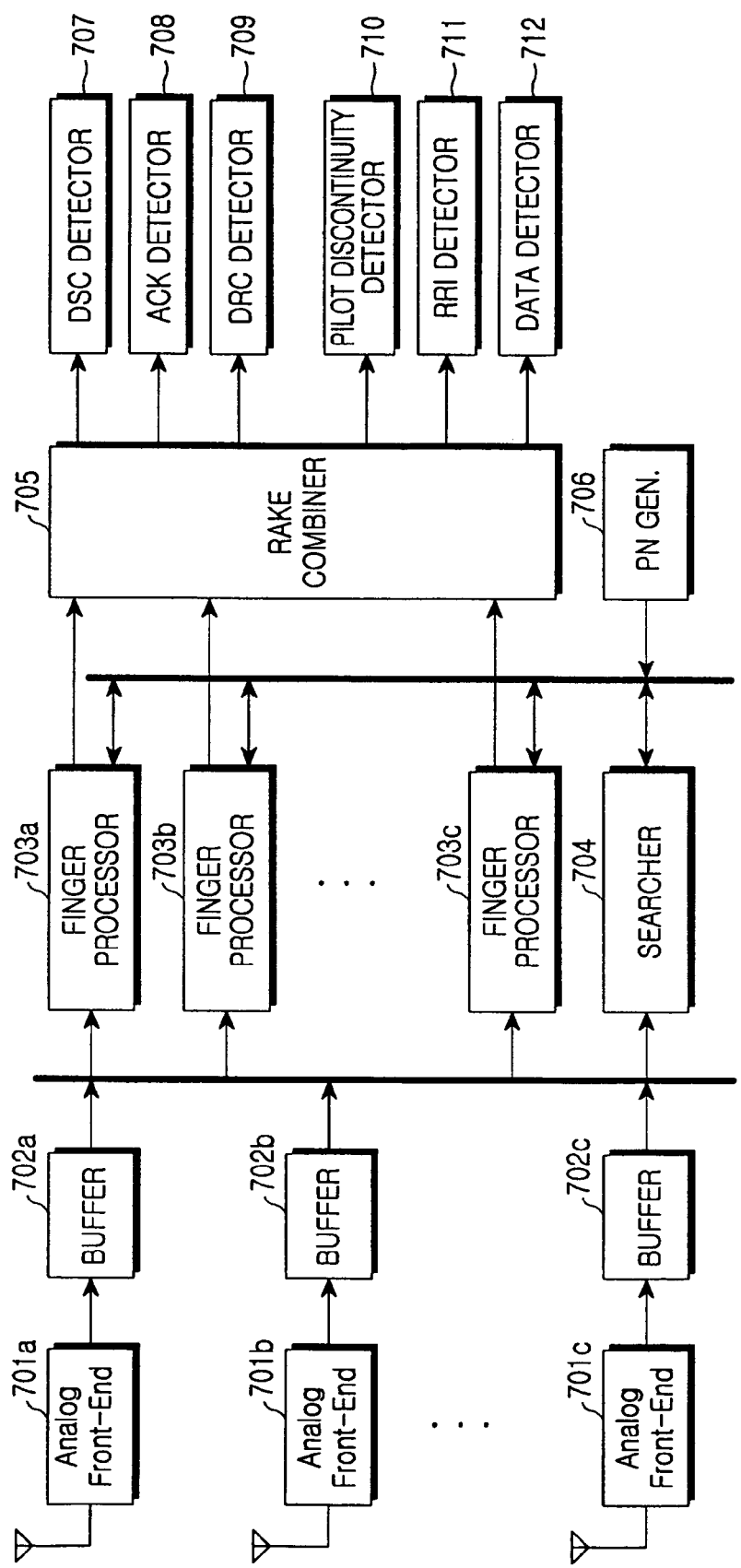
FIG. 7 is a block diagram illustrating a receiver of a base station in a 1xEV-DO Rev-A system in accordance with the first exemplary embodiment of the present invention.

FIG. 7 is a block diagram illustrating a receiver of a base station in a 1xEV-DO Rev-A system in accordance with the first exemplary embodiment of the present invention. The structure of the receiver of the base station in the 1xEV-DO Rev-A system in accordance with the first exemplary embodiment of the present invention will be described with reference to FIG. 7.

Signals received through one or more antennas are amplified in analog front-ends 701a~701c. After the amplified signals are converted into baseband signals, they are sampled and stored in buffers 702a~702c. The signals stored in the buffers 702a to 702c are input to finger processors 703a~703c and a searcher 704. The searcher 704 estimates a finger offset mapped to each mobile station and a channel path using a PN code generated in accordance with the received signal and the mobile station. The finger processors 703a~703c despread the received signals on a channel-by-channel basis using finger offsets estimated in the searcher 704. A Rake combiner 705 combines multi-path signals despread on a mobile station-by-mobile station basis. Using the combined signals, channel-by-channel detectors 707, 708, 709, and 712 detect DSC, ACK, DRC, and RRI symbols and recover data. In a method for increasing null-rate detection performance using the data channel detector 712 as in step 608 of FIG. 6, a pilot channel discontinuity detector 710 can be used. The pilot channel discontinuity detector 710 serves to determine whether a data transmission is present using a characteristic in which a pilot channel is discontinuously transmitted in the data non-transmission interval of FIG. 7.

Figure 8:
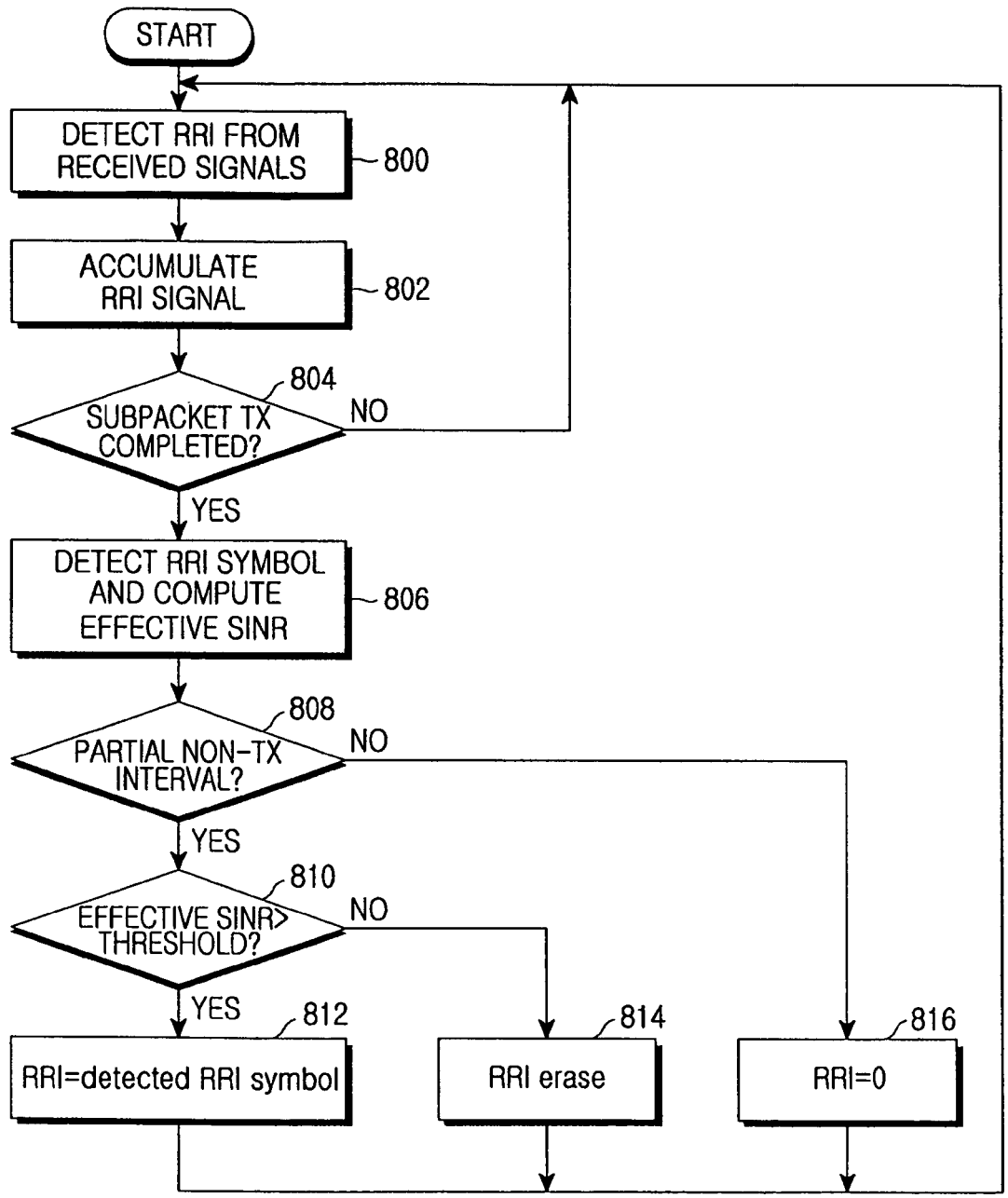
FIG. 8 is a control flow diagram when an RRI channel is verified in accordance with the first exemplary embodiment of the present invention.

FIG. 8 is a control flow diagram when an RRI channel of 1xEV-DO Rev-A is verified in accordance with the first exemplary embodiment of the present invention. FIG. 8 illustrates a reception algorithm when the method of FIG. 6 is applied. A process of FIG. 8 may have characteristics similar to those of FIG. 6. With reference to FIG. 8, a control flow will be described when the RRI channel of the 1xEV-DO Rev-A is verified in accordance with the first exemplary embodiment of the present invention.

Because a unique Walsh cover is used to distinguish the RRI channel from other channels in the 1xEV-DO Rev-A system, a receiver detects an RRI signal by despreading a received signal with a Walsh cover for the RRI channel in step 800. Then, the receiver proceeds to step 802 to consider a transmission pattern of a null-rate RRI and a correlation of an RRI signal that belongs to the same interlacing and accumulates the RRI signal during a regular interval according to need. This accumulation can be set according to whether an RRI symbol is repeated. After receiving the RRI symbol, the receiver proceeds to step 804 to retrieve a subpacket boundary and verify whether an RRI channel reception has been completed for one subpacket. That is, the receiver verifies whether a subpacket transmission has been completed. If the RRI channel reception for the subpacket has been completed, the receiver proceeds to step 806. If the RRI channel reception has not been completed, the receiver proceeds to step 800 to continuously perform the above-described process.

When proceeding to step 806 through the above-described process, the receiver detects an RRI symbol and a subpacket index from an accumulated RRI signal. The receiver estimates a correlation value for the RRI symbol detected to indicate detection the reliability and an effective SINR of the RRI channel from noise variance. Then, the receiver proceeds to step 808 to detect the presence of pilot channel gating to increase null-rate detection accuracy. That is, the receiver verifies whether the pilot channel is continuously transmitted in step 808, because a full non-transmission interval and a partial non-transmission interval are divided according to packet transmission as described above. When the pilot is continuously transmitted, a data packet transmission interval is an interval in which an RRI should be constantly transmitted. However, when the reverse pilot is discontinuously transmitted, the associated interval includes a full non-transmission interval in which no data is transmitted. Therefore, when no data packet is transmitted, no RRI is transmitted according to Scenario B of an exemplary embodiment of the present invention.

In the partial non-transmission interval, the receiver proceeds to step 810. In the full non-transmission interval rather than the partial non-transmission interval, the receiver proceeds to step 816. In the full non-transmission interval, an RRI value is set to 0. Since the full non-transmission interval is the interval in which no data is transmitted, the RRI value becomes 0. In the partial non-transmission interval, the receiver proceeds to step 810 to verify whether an effective SINR value estimated in step 806 is more than a predefined threshold value. If the effective SINR value is more than the predefined threshold value as a verification result, the receiver proceeds to step 812 to set a detected RRI symbol to an RRI value. That is, the RRI symbol and the subpacket index are set to finally recovered values. However, if the effective SINR value is equal to or less than the predefined threshold value, the RRI value is erased.

Figure 9:
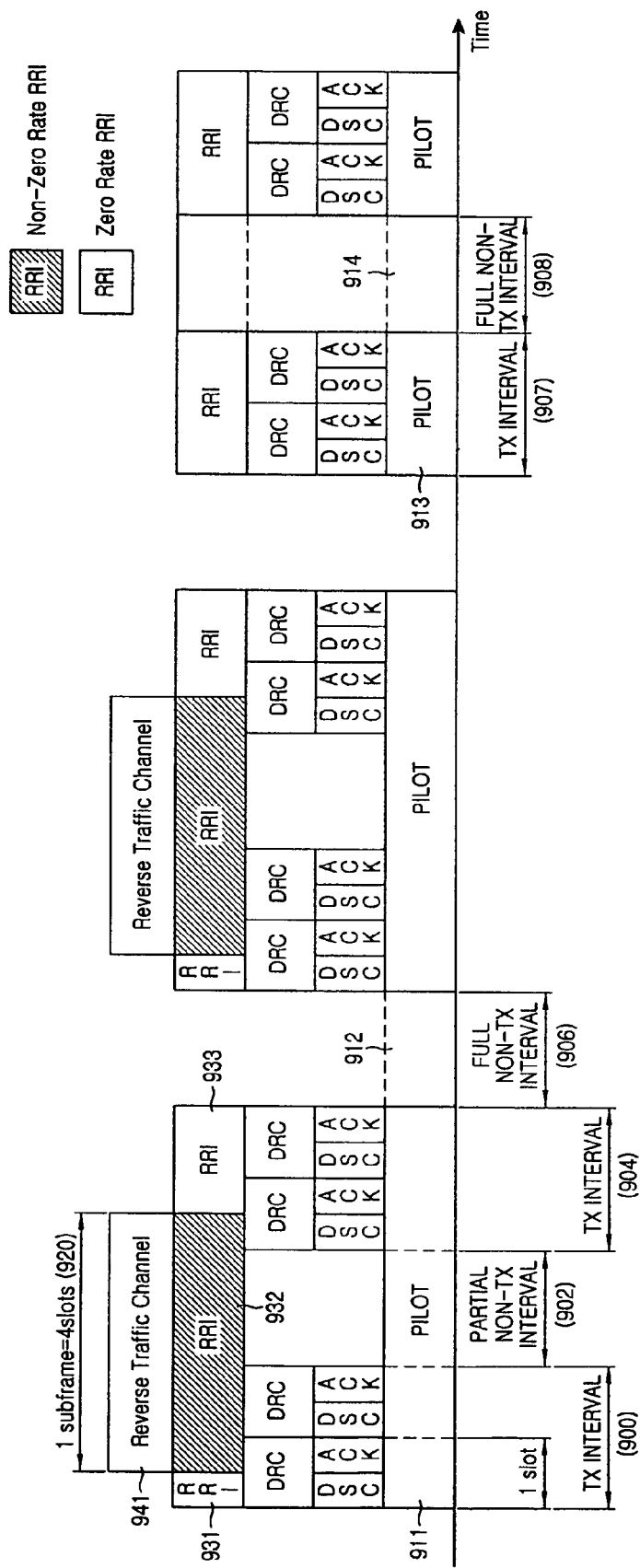
FIG. 9 is a timing diagram illustrating the transmission of a reverse channel in the DTX mode in a High Rate Packet Data (HRPD) mobile communication system in accordance with a second exemplary embodiment of the present invention.

FIG. 9 is a timing diagram illustrating the transmission of a reverse channel in the DTX mode in a High Rate Packet Data (HRPD) mobile communication system in accordance with a second exemplary embodiment of the present invention. The reverse channel transmission in the DTX mode in the HRPD mobile communication system in accordance with the second exemplary embodiment of the present invention will be described in detail with reference to FIG. 9.

Figure 1:
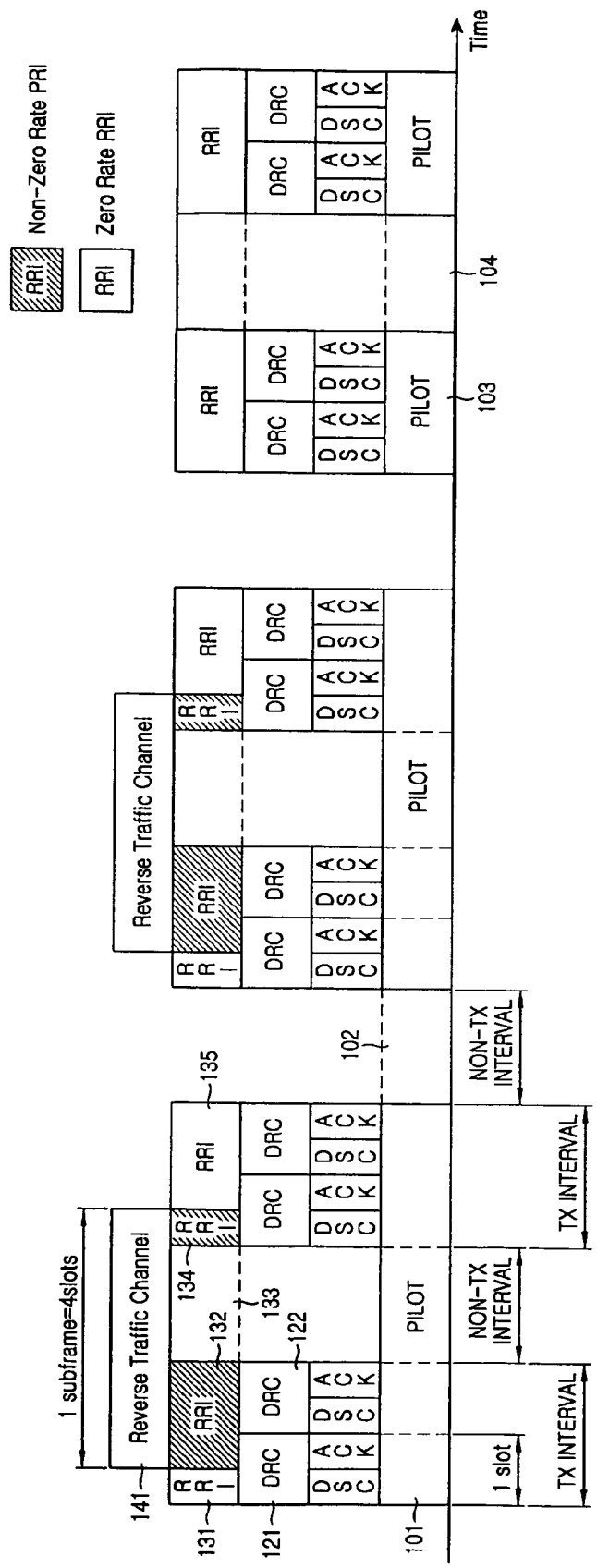
FIG. 1 is a timing diagram illustrating Discontinuous Transmission (DTX) mode for conventional control channels in a mobile communication system.

It is assumed that a state in FIG. 9 is analogous to those in FIG. 1 of the prior art and FIG. 5 of the first exemplary embodiment. A description of the analogous parts is omitted. Only different parts between FIGS. 5 and 9 will be described.

The second exemplary embodiment of the present invention transmits RRI information in a partial non-transmission interval 902, which is different from the prior art. According to the prior art, only a reverse pilot channel is transmitted in the partial non-transmission interval. However, information for indicating a transmission rate of data traffic in the reverse direction is continuously transmitted in the partial non-transmission interval in accordance with the exemplary embodiment of the present invention. While the data traffic is transmitted in the reverse direction, the RRI information is continuously transmitted to increase demodulation and decoding performances of the reverse data traffic. Other control information is discontinuously transmitted and the full non-transmission interval is included in an interval in which no data traffic is transmitted in the reverse direction to obtain a gain in the discontinuous transmission. Hereinafter, an interval in which data to be transmitted in the reverse direction is present and a total of an RRI value is transmitted is referred to as a full transmission interval for an RRI. In the second exemplary embodiment of the present invention, an example in which the RRI is transmitted according to a transmission interval and a non-transmission interval will be described. That is, a reverse RRI value for indicating reverse data traffic of 0 is transmitted in the transmission interval even when reverse data traffic is absent. This transmission example is indicated by reference numerals 931 and 933 of FIG. 9.

The structure and operation of an apparatus for transmitting a reverse control channel as illustrated in FIG. 9 will be described.

Figure 10:
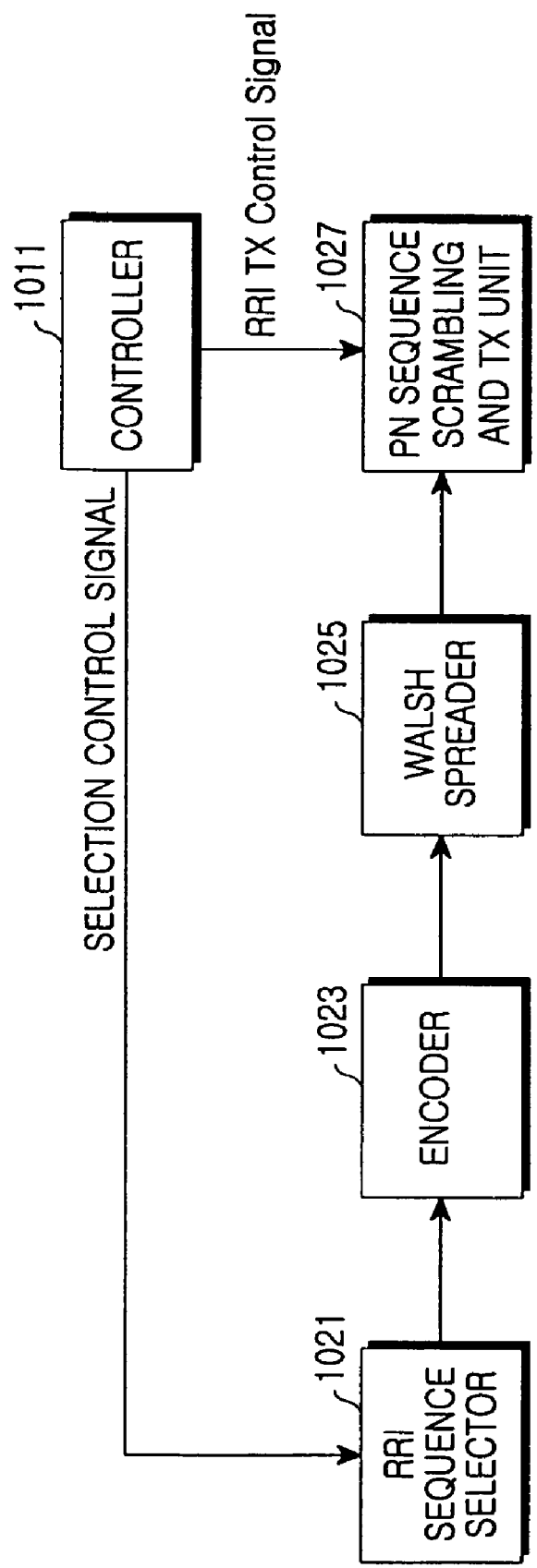
FIG. 10 is a block diagram illustrating a structure for transmitting an RRI signal from a mobile station in accordance with the second exemplary embodiment of the present invention.

FIG. 10 is a block diagram illustrating a structure for transmitting an RRI signal from a mobile station in accordance with the second exemplary embodiment of the present invention. The structure and operation for transmitting the RRI signal from the mobile station in accordance with the second exemplary embodiment of the present invention will be described with reference to FIG. 10.

A controller 1011 verifies whether traffic to be transmitted by the mobile station is present. When reverse traffic is transmitted as the traffic to be transmitted by the mobile station is present, a transmission control signal of RRI information is output and a selection control signal for selecting an RRI sequence is output in accordance with an exemplary embodiment of the present invention. In response to the selection control signal received from the controller 1011, an RRI sequence selector 1021 selects and outputs one of sequences mapped to RRI information. This RRI sequence is selected in accordance with a data transmission rate or packet size. An encoder 1023 encodes a signal output from the RRI sequence selector 1021. The encoder 1023 encodes an RRI symbol with a block code of (32, 6) and then outputs the encoded symbol. The symbol encoded by the encoder 1023 is input to a Walsh spreader 1025. The Walsh spreader 1025 Walsh spreads the encoded symbol. The spread symbol is output to a PN sequence scrambling and transmission unit 1027. The PN sequence scrambling and transmission unit 1027 scrambles and transmits the RRI signal Walsh-spread by the Walsh spreader 1025 in response to the RRI transmission control signal received from the controller 1011. The controller 1011 then generates the RRI transmission control signal according to the presence of the RRI transmission and the number of repeats in an RRI transmission setting method and then transfers the generated RRI transmission control signal to the PN sequence scrambling and transmission unit 1027. The PN sequence scrambling and transmission unit 1027 repeats and transmits the input signal if needed.

Figure 11:
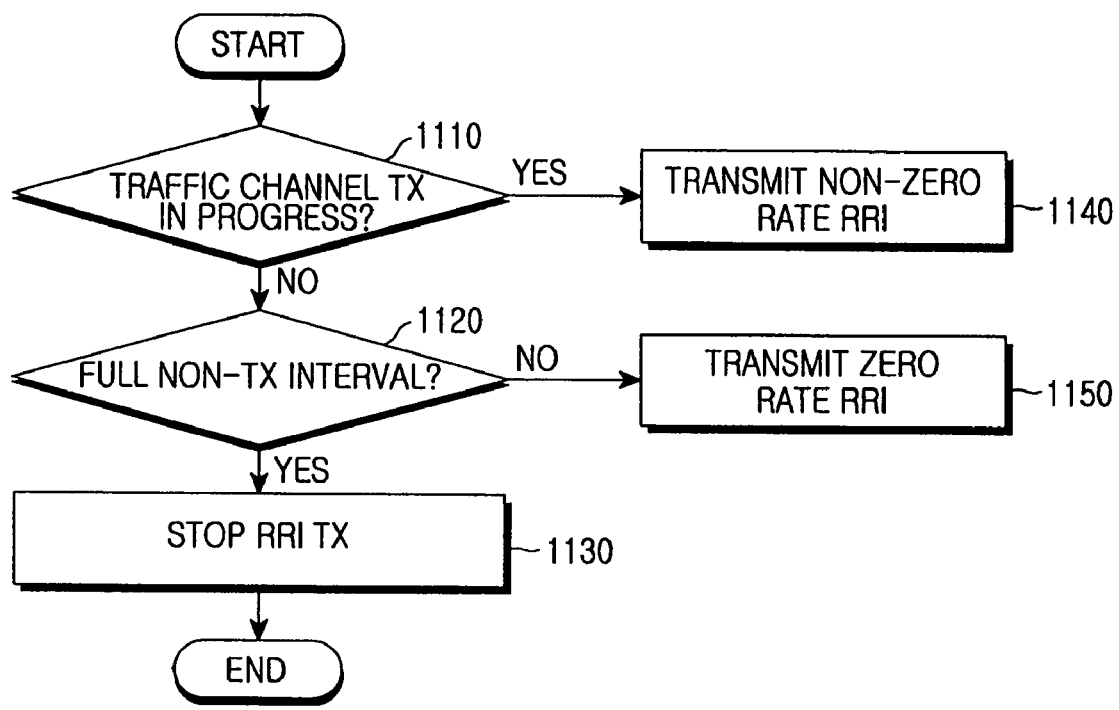
FIG. 11 is a control flow diagram illustrating the transmission of RRI control information from the mobile station in accordance with the second exemplary embodiment of the present invention.

FIG. 11 is a control flow diagram illustrating the transmission of RRI control information from the mobile station in accordance with the second exemplary embodiment of the present invention. With reference to FIG. 11, a control process is described when the mobile station transmits RRI control information in accordance with the exemplary embodiment of the present invention.

The controller 1011 verifies whether a reverse traffic transmission through a reverse traffic channel is in progress in step 1110. The reason why the controller 1011 verifies whether the reverse traffic transmission through the reverse traffic channel is in progress is that a transmission interval 900, a partial non-transmission interval 902, and a full non-transmission interval 906 are present in an exemplary embodiment of the present invention as illustrated in FIG. 9. If the traffic transmission through the reverse traffic channel is in progress, only the transmission interval 900 or the partial non-transmission interval 902 is present. However, if the traffic transmission is not in progress, only the full non-transmission interval and the transmission interval are present. If the traffic transmission through the reverse traffic channel is in progress as a verification result in step 1110, the controller 1011 proceeds to step 1140 to transmit an RRI at a non-zero rate. The RRI includes information about a data transmission rate or packet size of a reverse traffic channel. An associated data transmission rate or packet size may have a value of more than 0. The RRI in which the data transmission rate or packet size may have a value of more than 0 is referred to as a non-zero rate RRI. If a non-zero RRI value is transmitted, it means that an RRI value of traffic is transmitted on the reverse traffic channel. The partial non-transmission interval and the transmission interval are present in a traffic transmission interval, and RRI values of the two intervals are set according to reverse traffic transmission.

Alternatively, if the traffic transmission through the reverse traffic channel is not in progress as the verification result in step 1110, the controller 1011 proceeds to step 1120 to verify whether the associated interval is the full non-transmission interval. The reason why the full non-transmission interval is verified in the interval in which no data traffic is transmitted in step 1120 is that only a transmission interval 907 and a full non-transmission interval 908 are present when no traffic is transmitted. Thus, the controller 1011 verifies whether the associated interval is the full non-transmission interval in step 1120. If the associated interval is the full non-transmission interval 908 as the verification result, the controller 1011 proceeds to step 1130 to stop the RRI transmission. However, if the associated interval is not the full non-transmission interval but is the transmission interval, the controller 1011 proceeds to step 1150 to set and transmit a zero rate RRI value because reverse traffic is absent. The zero rate RRI indicates information in which the data transmission rate or packet size of the reverse traffic channel is 0. That is, the RRI in which the data transmission rate or packet size may have a value of 0 is referred to as the zero rate RRI. The RRI transmission is stopped since the associated interval is the full non-transmission interval in which no reverse control signal is transmitted when the controller 1011 proceeds from step 1120 to step 1130,.

Figure 12:
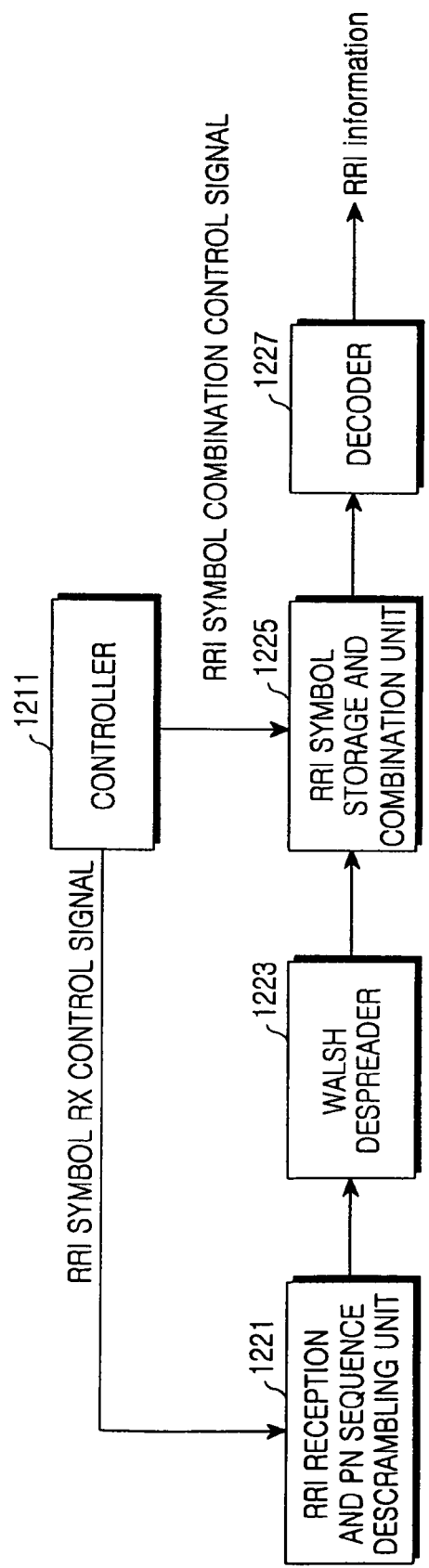
FIG. 12 is a block diagram illustrating an apparatus for receiving an RRI in a base station in accordance with the second exemplary embodiment of the present invention.

FIG. 12 is a block diagram illustrating an apparatus for receiving an RRI in a base station in accordance with the second exemplary embodiment of the present invention. The apparatus for receiving an RRI in the base station in accordance with the second exemplary embodiment of the present invention will be described in detail with reference to FIG. 12.

An RRI reception controller 1211 classifies an interval in which an RRI is received and an interval in which no RRI is received. Basically, the intervals are divided into a transmission interval and a non-transmission interval as illustrated in FIG. 9. The controller 1211 can further classify a partial non-transmission interval in the non-transmission interval according to the presence of reverse traffic. Thus, the RRI reception controller 1211 generates an RRI reception control signal to receive an RRI symbol and then outputs the generated RRI reception control signal to an RRI reception and PN sequence descrambling unit 1221. In the case of an interval in which an RRI signal is not received, such as, a full non-transmission interval, the RRI reception controller 1211 commands the RRI reception and PN sequence descrambling unit 1221 to stop the reception process through the RRI reception control signal. When the RRI signal is received, the RRI reception controller 1211 controls the RRI reception and PN sequence descrambling unit 1221 to receive and process the RRI signal through the RRI reception control signal. Then, the RRI reception and PN sequence descrambling unit 1221 receives a signal carrying an RRI from a PN sequence descrambler (not illustrated in FIG. 12) among radio signals received by the base station's receiver (not illustrated in FIG. 12) in accordance with the RRI reception control signal. The RRI reception and PN sequence descrambling unit 1221 performs a PN sequence descrambling process for the received signal. The descrambled signal is input to a Walsh despreader 1223. The Walsh despreader 1223 Walsh despreads the input signal and outputs the despread signal to an RRI symbol storage and combination unit 1225.

When receiving the Walsh-despread signal, the RRI symbol storage and combination unit 1225 stores and combines an RRI symbol in response to an RRI symbol combination control signal received from the RRI reception controller 1211. That is, when the RRI symbol is repeatedly transmitted at least twice, the RRI reception controller 1211 generates the RRI symbol combination control signal and then transmits the generated signal to the RRI symbol storage and combination unit 1225, so that the unit 1225 combines previous and current symbols. Thereafter, the repeated signal is continuously transmitted. If a currently transmitted RRI symbol is not the last transmission, it is stored in an internal memory (not illustrated in FIG. 12). When a combination up to the last RRI symbol is performed through the above-described process, the RRI symbol storage and combination unit 1225 outputs a combined RRI symbol so that a decoder 1227 decodes the symbol. As described above, the RRI symbol is encoded through a (32, 6) encoder and is decoded through a (32, 6) decoder. When the decoder 1227 performs a decoding process, RRI information is output.

Figure 13:
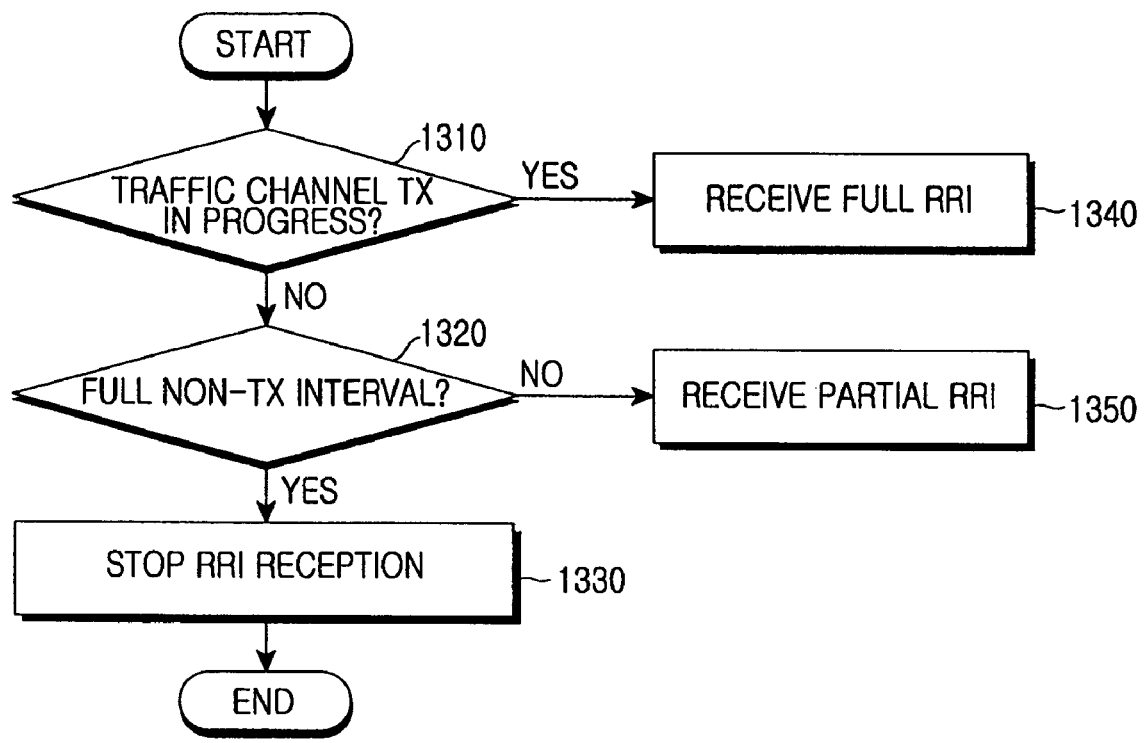
FIG. 13 is a control flow diagram illustrating the receipt of an RRI signal in the base station in accordance with the second exemplary embodiment of the present invention.

FIG. 13 is a control flow diagram when an RRI signal is received in the base station in accordance with the second exemplary embodiment of the present invention. A process for receiving the RRI signal in the base station in accordance with the second exemplary embodiment of the present invention will be described with reference to FIG. 13.

The RRI reception controller 1211 verifies whether a traffic reception through a reverse traffic channel is in progress in step 1310. If the traffic reception is in progress, as a verification result, the controller 1211 proceeds to step 1340. Otherwise, the controller 1211 proceeds to step 1320. The controller 1211 verifies whether the traffic reception is in progress so that an RRI symbol can be normally transmitted also in the non-transmission interval when the reverse traffic is transmitted in accordance with an exemplary embodiment of the present invention. That is, when the reverse traffic is transmitted, the RRI symbol is transmitted in the partial non-transmission interval of the non-transmission interval. Thus, when the reverse traffic is received, the RRI reception controller 1211 generates and outputs the RRI reception control signal and the RRI symbol combination control signal for a full RRI reception. Because the RRI reception operation is analogous to that described with reference to FIG. 12, its detailed description is omitted.

Alternatively, if the traffic reception is not in progress as the verification result in step 1310, the RRI reception controller 1211 proceeds to step 1320 to verify whether the current time corresponds to the full non-transmission interval. If the current time corresponds to the full non-transmission interval as a verification result in step 1320, the RRI reception controller 1211 proceeds to step 1330 to stop the RRI reception. Since the full non-transmission interval is an interval in which reverse traffic is absent as described with reference to FIG. 9, a signal is not transmitted on any one of the reverse control channels. However, if the current time is not the full non-transmission interval as the verification result in step 1320, the RRI reception controller 1211 proceeds to step 1350 to receive a partial RRI. The partial RRI is received because a zero-rate RRI value is transmitted in an interval in which no reverse traffic is transmitted. Thus, an additional function such as outer-loop power control in the reverse direction can be performed using the partial RRI. If the current time is an interval in which no reverse traffic is transmitted in step 1320, it corresponds to either the full non-transmission interval or the transmission interval in which the reverse traffic is absent. When the current time is not the full non-transmission interval, the partial RRI can be received.

When the present invention is applied to a communication system using a packet transmission, the transmit power of a DRI channel and the average transmit power can be reduced in a data non-transmission interval. A receiver can reduce an error of null-rate symbol detection in the data non-transmission interval in which the transmit power is reduced using a data channel detector independent of the DRI channel. When this method is extended and applied to a 1xEV-DO system, an error rate according to data transmission can be reduced.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting at a mobile station reverse channels in a Discontinuous Transmission (DTX) mode including a transmission interval and a non-transmission interval in a mobile communication system, comprising:

if a reverse traffic channel is not transmitted, setting a power of a Reverse Rate indicator (RRI) channel to a first power level, transmitting the RRI channel on the first power level, transmitting a pilot channel in the transmission interval in the DTX mode, and not transmitting the pilot channel in the non-transmission interval in the DTX mode; and if the reverse traffic channel is transmitted, setting the power of the RRI channel to a second power level, transmitting the RRI channel on the second power level, and transmitting the pilot channel, wherein the RRI channel comprises information representative of data rate of the reverse traffic channel, and the first power level is equal to or higher than 0 and lower than the second power level.

2. An apparatus for transmitting reverse control channels in a Discontinuous Transmission (DTX) mode including a transmission interval and a non-transmission interval in a mobile communication system, comprising:

a transmitter for transmitting a plurality of channels including a Reverse Rate Indicator (RRI) channel, a reverse traffic channel, and a pilot channel over a wireless network; and a controller for controlling operations of:

if the reverse traffic channel is not transmitted, setting a power of the RRI channel to a first power level, transmitting the RRI channel on the first power level, transmitting the pilot channel in the transmission interval in the DTX mode, and not transmitting the pilot channel in the non-transmission interval in the DTX mode; and if the reverse traffic channel is transmitted, setting the power of the RRI channel to a second power level, transmitting the RRI channel on the second power level, and transmitting the pilot channel, wherein the RRI channel comprises information representative of a data rate of the reverse traffic channel and the first power level is equal to or higher than 0. and lower than the second power level.

3. The method of claim 1, further comprising determining whether the reverse traffic channel is transmitted.

4. The method of claim 1, further comprising transmitting a Data Rate Control (DRC) channel, an ACK channel and a Data Source Control (DSC) channel in the transmission interval of the DTX mode.

5. The method of claim 1, further comprising stopping the transmission of a Data Rate Control (DRC) channel, an ACK channel and a Data Source Control (DSC) channel in the non-transmission interval of the DTX mode.

6. The apparatus of claim 2, wherein the controller determines whether the reverse traffic channel is transmitted.

7. The apparatus of claim 2, wherein the controller controls the transmitter to transmits a Data Rate Control (DRC) channel, an ACK channel and a Data Source Control (DSC) channel in the transmission interval of the DTX mode.

8. The apparatus of claim 2, wherein the controller controls the transmitter to stop the transmission of a Data Rate Control (DRC) channel, an ACK channel and a Data Source Control (DSC) channel in the transmission interval of the DTX.

9. The method of claim 4, wherein the DSC channel is transmitted in a half slot of one slot and the ACK channel is transmitted in the remaining half slot.

10. The method of claim 4, wherein the DRC channel, the DSC channel, and the ACK channel is discontinuously transmitted in a 2-slot unit.

11. The method of claim 1, wherein if the reverse traffic channel is transmitted, the RRI channel and the reverse traffic channel are transmitted in parallel.

12. The method of claim 10, wherein the DSC channel is transmitted in a half slot of one slot and the ACK channel is transmitted in the remaining half slot.

13. The method of claim 10, wherein the DRC channel, the DSC channel, and the ACK channel is discontinuously transmitted in a 2-slot unit.

14. The method of claim 2, wherein if the reverse traffic channel is transmitted, the RRI channel and the reverse traffic channel are transmitted in parallel.

15. A method for receiving at a base station reverse channels in a Discontinuous Transmission (DTX) mode including a transmission interval and a non-transmission interval in a mobile communication system, comprising:

if a reverse traffic channel is not received, receiving a Reverse Rate Indicator (RRI) channel on the first power level set by a mobile station, and receiving a pilot channel in the transmission interval in the DTX mode; and if the reverse traffic channel is received, receiving the RRI channel on the second power level set by the mobile station, and receiving the pilot channel, wherein the RRI channel comprises information representative of data rate of the reverse traffic channel, and the first power level is equal to or higher than 0 and lower than the second power level, and wherein the pilot channel is not transmitted in the non-transmission interval in the DTX mode, if the reverse traffic channel is not transmitted.

16. The method of claim 15, further comprising determining whether the reverse traffic channel is received.

17. The method of claim 15, further comprising receiving a Data Rate Control (DRC) channel, an ACK channel and a Data Source Control (DSC) channel in the transmission interval of the DTX mode.

18. The method of claim 17, wherein the DRC channel, the ACK channel, and the DSC channel are not transmitted in the non-transmission interval of the DTX mode.

19. The method of claim 17, wherein the DSC channel is transmitted in a half slot of one slot and the ACK channel is transmitted in the remaining half slot.

20. The method of claim 17, wherein the DRC channel, the DSC channel, and the ACK channel is discontinuously transmitted in a 2-slot unit.

21. The method of claim 15, wherein if the reverse traffic channel is transmitted, the RRI channel and the reverse traffic channel are transmitted in parallel.

22. An apparatus for receiving reverse channels in a Discontinuous Transmission (DTX) mode including a transmission interval and a non-transmission interval in a mobile communication system, comprising:

a receiver for receiving a pilot channel, a reverse traffic channel, a Reverse Rate Indicator (RRI) channel, Data Rate Control (DRC) channel, an ACK channel and a Data Source Control (DSC) channel; and a controller for controlling the receiver to receive the RRI channel on the first power level set by a mobile station and the pilot channel in the transmission interval in the DTX mode, if the reverse traffic channel is not received; and for controlling the receiver to receive the RRI channel on the second power level set by the mobile station, and receive the pilot channel, if the reverse traffic channel is received, wherein the RRI channel comprises information representative of data rate of the reverse traffic channel, and the first power level is equal to or higher than 0 and lower than the second power level, wherein the pilot channel is not transmitted in the non-transmission interval in the DTX mode.

23. The apparatus of claim 22, wherein the controller determines whether the reverse traffic channel is received.

24. The apparatus of claim 22, wherein the controller controls the receiver to receive the DRC channel, the ACK channel and the DSC channel in the transmission interval of the DTX mode.

25. The apparatus of claim 22, wherein the DRC channel, the ACK channel and the DSC channel is not transmitted in non-transmission interval of the DTX mode.

26. The method of claim 24, wherein the DSC channel is transmitted in a half slot of one slot and the ACK channel is transmitted in the remaining half slot.

27. The method of claim 24, wherein the DRC channel, the DSC channel, and the ACK channel is discontinuously transmitted in a 2-slot unit.

28. The method of claim 22, wherein if the reverse traffic channel is transmitted, the RRI channel and the reverse traffic channel are transmitted in parallel.

* * * * *